United States Patent [19]
Ghosh et al.

[11] Patent Number: 5,629,934
[45] Date of Patent: May 13, 1997

[54] POWER CONTROL FOR CDMA COMMUNICATION SYSTEMS

[75] Inventors: Amitava Ghosh, Fort Worth; Kamyar Rohani, Grapevine, both of Tex.

[73] Assignee: Motorola, Inc., Schaumburg, Ill.

[21] Appl. No.: 491,336

[22] Filed: Jun. 30, 1995

[51] Int. Cl.⁶ ........................................ H04J 13/00
[52] U.S. Cl. .................. 370/335; 370/342; 370/522; 455/38.3
[58] Field of Search ..................... 370/18, 84, 110.4, 370/111; 455/38.3, 54.1; 375/205, 225; 371/5.1, 5.5

[56] References Cited

U.S. PATENT DOCUMENTS

| | | | |
|---|---|---|---|
| 5,056,109 | 10/1991 | Gilhousen et al. | 375/205 |
| 5,216,692 | 6/1993 | Ling | 375/200 |
| 5,396,516 | 3/1995 | Padovani et al. | 375/225 |
| 5,511,073 | 4/1996 | Padovani et al. | 370/118 |
| 5,528,593 | 6/1996 | English et al. | 370/84 |
| 5,530,716 | 6/1996 | Lipa | 370/18 |

OTHER PUBLICATIONS

Gateway to the Future Technology in Motion, 41st IEEE Vehicular Technology Conference, May 19–22, 1991, St. Louis, MO.

TIA/EIA/IS-95, Section 6 pp. 7–20 and Section 7 pp. 1–38.

*Primary Examiner*—Douglas W. Olms
*Assistant Examiner*—Min Jung
*Attorney, Agent, or Firm*—Raymond J. Warren

[57] ABSTRACT

A transmitter transmits the desired signal using a continuous duty cycle at transmission rates of less than full rate (FIG. 6). The energy used in each power control group is related to the transmission rate. By repeating the power control groups, time division diversity (FIG. 6) is provided. In the receiver, the received power control groups are analyzed and compared to several levels of energy thresholds (73, 75, 77, 79). The results of the comparisons are converted into a power control signal (74, 76, 78, 80, 81) and returned to the mobile. The mobiles are capable of selecting the appropriate bit (93) and adjusting their power (94). Alternatively, an indicator of the transmission rate can be forwarded (155) in advance of the frame. The receiver compares a power estimate with the threshold for the transmission rate indicated (166).

4 Claims, 8 Drawing Sheets

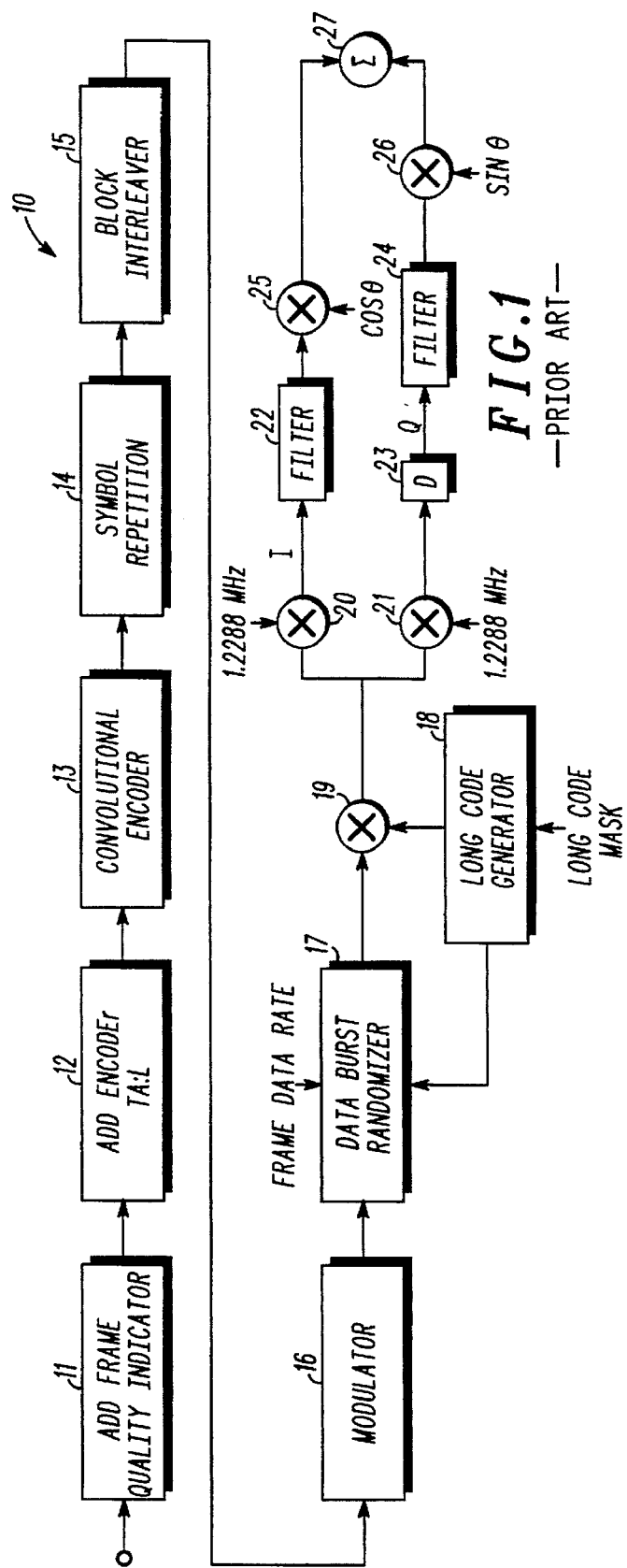
FIG.1 —PRIOR ART—
FIG.2 —PRIOR ART—

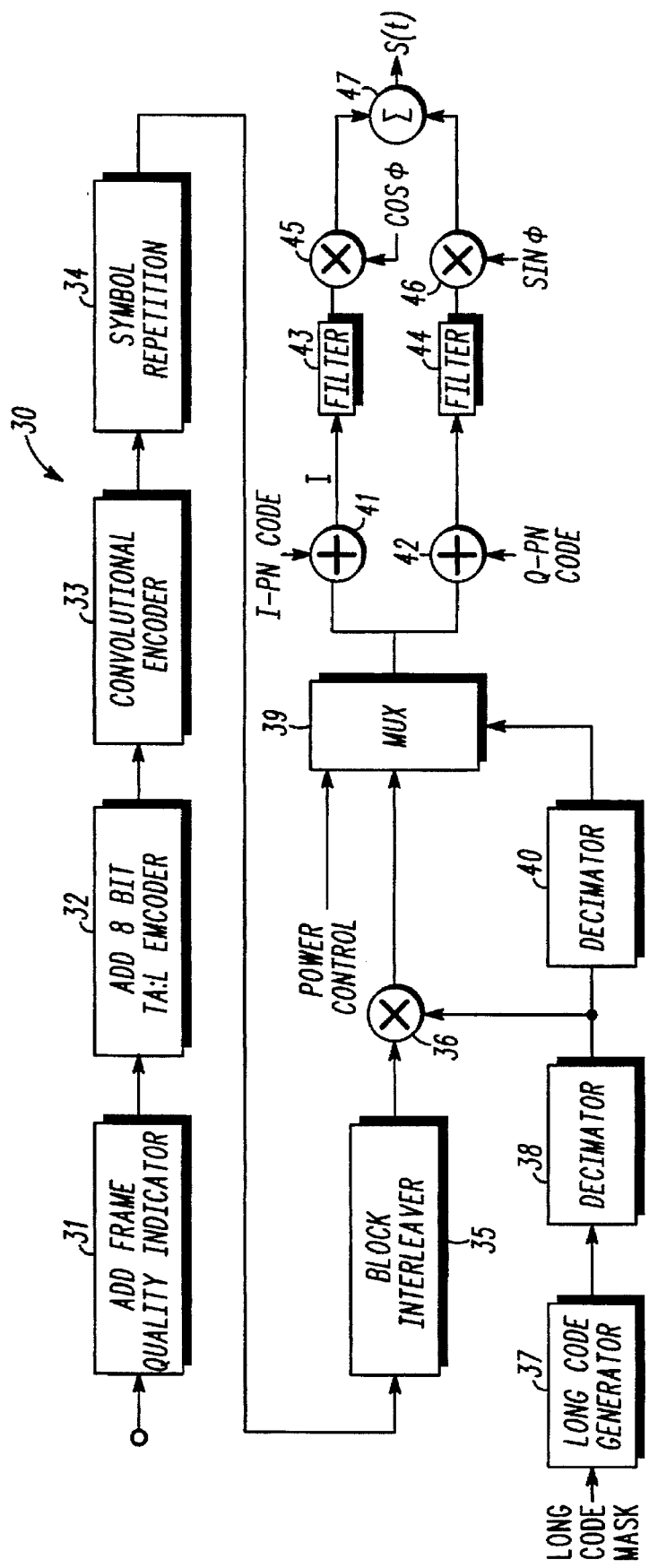
*FIG. 3* —PRIOR ART—

| POWER CONTROL GROUP RATES | 1 | 2 | 3 | 4 | 5 | 6 | 7 | 8 | 9 | ... | 16 |
|---|---|---|---|---|---|---|---|---|---|---|---|
| FULL | | | | | | | | | | | |
| | | | | | | | | | | | |
| HALF | $1_A$ | $2_A$ | $1_B$ | $3_A$ | $2_B$ | $3_B$ | $4_A$ | $5_A$ | $4_B$ | | $8_B$ |
| | | | | | | | | | | | |
| QUARTER | $1_A$ | $2_A$ | $1_B$ | $2_B$ | $1_C$ | $3_A$ | $2_C$ | $1_D$ | $3_B$ | | $4_D$ |
| | | | | | | | | | | | |
| EIGHTH | $1_A$ | $2_A$ | $1_B$ | $2_B$ | $1_C$ | $2_C$ | $1_D$ | $2_D$ | $1_E$ | ... | $2_H$ |

FIG. 6

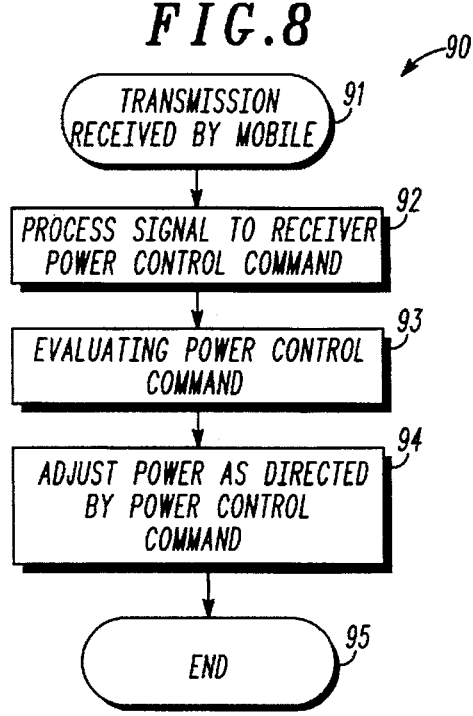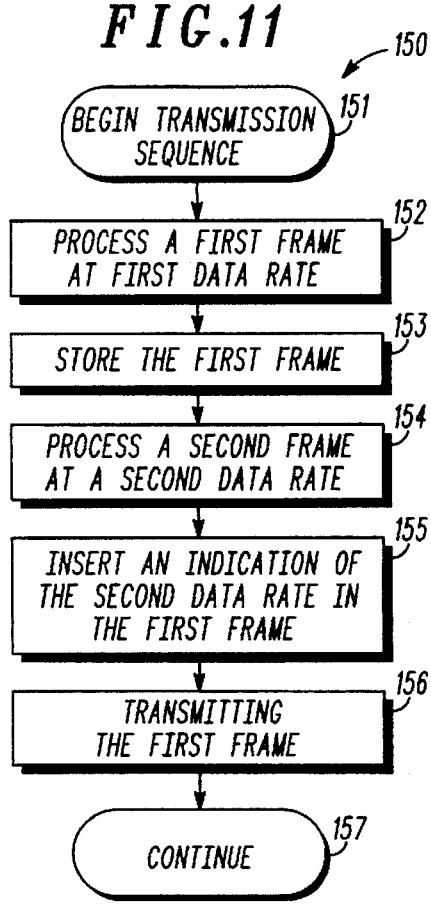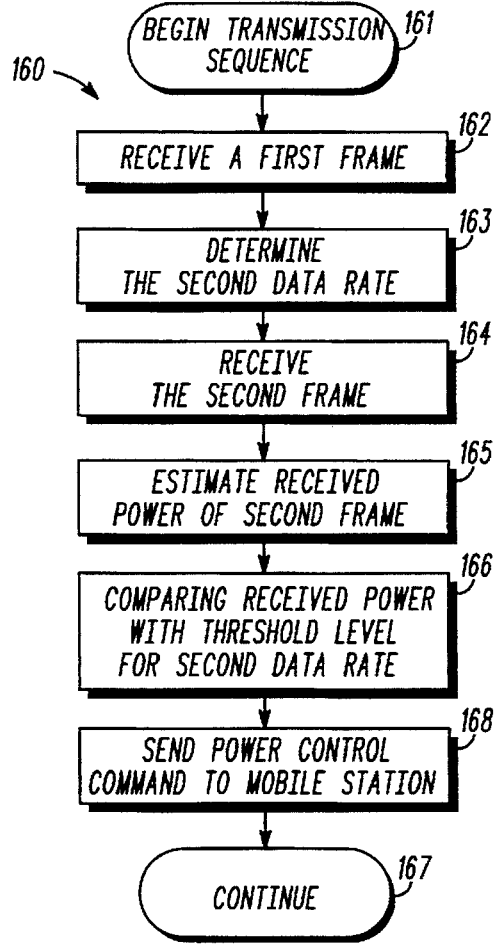

POWER CONTROL FOR CDMA COMMUNICATION SYSTEMS

FIELD OF THE INVENTION

The present invention relates, in general, to CDMA (Code Division Multiple Access) communication systems, and more particularly, to power control for CDMA communication systems.

BACKGROUND OF THE INVENTION

The existing CDMA Interim Standard (IS-95 et seq.) was developed by the TIA (Telecommunications Industry Association) and EIA (Electronics Industry Association). In IS-95, when a transmission rate is utilized which is less than the full rate, a discontinuous (burst type) signal is transmitted. This signal is divided into logical frames which are 20 ms (milliseconds) in length. The frames are divided into 16 smaller portions (or slots) which are referred to as power control groups. The base station demodulator estimates the energy of each power control group received from the mobile station. If the energy is above a threshold ($E_s$) then the base station will send back a power control signal directing the mobile to reduce its transmit power by one step. If the energy is below $E_s$, then the power control signal will direct the mobile to increase its transmit power by one step. For full rate transmissions, each power control group is used and there is no problem.

The problems arise in the transmission rates that are not full rate, such as quarter rate. Presently, a quarter rate transmission will only transmit in a quarter, or four, of the power control groups. There will be nothing related to this transmission transmitted in the remaining twelve power control groups. However, the energy of the power control groups that are not used is still measured. This measurement results in the transmission of a power control signal from the base site to the mobile. Currently it is up to the mobile to keep track of which power control groups were used and to ignore power control commands that result from the energy measurement of power control groups that were not used.

The present systems use a bursted duty cycle (i.e. don't use all of the slots in a frame) for transmission of signals at rates other than full rate. Since there is only one threshold power level, in order to have an accurate reading, each burst must meet the same $E_s$ threshold as the continuous full rate transmission.

BRIEF DESCRIPTION OF THE DRAWINGS

FIG. 1 is a prior art block diagram of a CDMA reverse channel structure;

FIG. 2 is a prior art matrix of power control groups by transmission rate;

FIG. 3 is a block diagram of a prior art CDMA forward channel structure;

FIG. 6 is a matrix of power control groups by transmission rates as used by the present invention;

FIG. 8 is a flow chart of a power control process of a mobile station utilizing the present invention;

FIGS. 11 and 12 are flow charts of an alternative power control process of a base station utilizing the present invention.

DETAILED DESCRIPTION OF THE DRAWINGS

Figure 4:
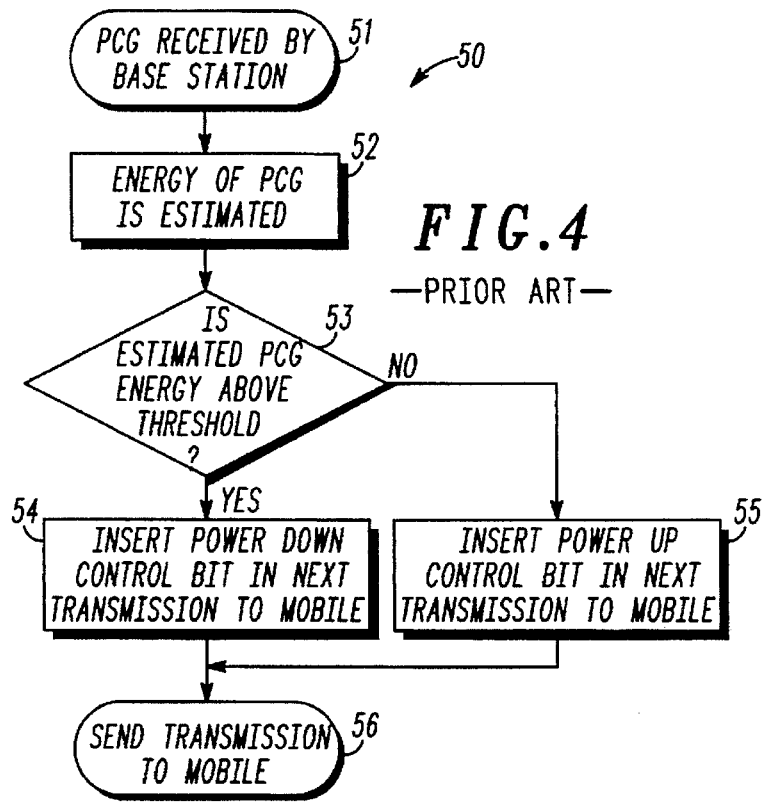
FIG. 4 is a flow chart of a prior art power control process of a prior art base station.

Referring initially to FIG. 1, a block diagram of a prior art CDMA reverse channel structure, generally designated 10, is illustrated. This is the design of a mobile station transmitter. The signal to be transmitted is received at block 11 where a frame quality indicator is added to the signal. Next, tail bits are added in block 12. The signal is then convolutionally encoded in block 13 and symbol repetition is performed in block 14. The data is then interleaved (block 15) and modulated (block 16).

Next, a data burst randomizer 17 is used to select which of the power control groups will be used for transmission of the signal. Referring to FIG. 2, a matrix, generally designated 29, of the power control groups divided by rate is provided. In the present example, there are sixteen logical power control groups (PCGs) per frame. When a full rate transmission is selected, then all sixteen of the PCGs are used. When a half rate transmission is used, only half of the PCGs are used. As shown, the half of the PCGs that are used is not divided by even or odd numbered PCGs. This is the function of randomizer 17. It randomly selects eight of the 16 PCGs to be used. The same is done for the quarter and eighth rates; the randomizer selects four or two, respectively, PCGs to be used for transmission. It should be noted here that the power level used for each PCG, as represented by the height of the block, is the same. Returning now to FIG. 1, a long code generator 18 provides a signal to mixer 19 which is combined with the output from burst randomizer 17. The resulting signal is divided into I and Q components by dividing the signal; up converting by mixing with a 1.2288 MHz (MegaHertz) signal; and delaying the Q signal in delay 23. The I and Q components are then filtered in filters 22 and 24, respectively; and mixed with the cosine and sine of a signal $\phi$. The two signals are then combined in summer 27 to provide the signal to be transmitted.

A more detailed description of the operation of the transmitter of FIG. 1 can be found in the TIA/EIA/IS-95 beginning at section 6.1.3.

In FIG. 3, a block structure of a CDMA forward channel structure, generally designated 30, is illustrated. Channel structure 30 receives a signal to be transmitted and processes it through much of the same process described with FIG. 1. The signal to be transmitted is modified by adding a frame quality indicator 31 and a tail encoder 32. The signal is further processed by convolutional encoding, symbol repetition, and block interleaving, blocks 33–35. The output of block interleaver 35 is then mixed with a long code which is generated in long code generator 37 and decimated in decimator 38 to reduce it from 1.2288 Mcps (Megacharacters per second) to 19.2 ksps (kilosymbols per second).

The mixed signal is then input to multiplexer (MUX) 39 where it is multiplexed with the power control bit. Multiplexer 39 is clocked by the long code which has been further decimated in decimator 40 to 800 Hz. MUX 39 is used to puncture the data stream and insert the power control bit into the signal to be transmitted.

The signal is then divided and added to an I-Channel PN (PseudoNumber) in adder 41 and to a Q-Channel PN in adder 42. The resulting signals are filtered in filters 43 and 44, respectively. The output from filters 43 and 44 are mixed with the cosine and sine of a signal ø, respectively, in mixers 45 and 46. The resulting signals are then summed together in summer 47 to provide the signal (S(t)) to be transmitted.

This signal, when received by the mobile station, is processed; the power control bit is identified; and the mobile station adjusts its power accordingly.

Referring now to the flow chart of FIG. 4, a method of controlling power, generally designated 50, utilized by a prior art base station is illustrated. Method 50 commences when a PCG is received by the base station, step 51. In actual implementation, the PCG is all of the signal received by the base station during a particular time period, whether transmitted by a particular mobile station or derived from some other source. The first portion received, first PCG, is then analyzed to estimate the energy (or received power level), step 52.

The energy estimate is then compared to a threshold ($E_s$) in decision step 53. If the estimate exceeds $E_s$, then a down power control bit is inserted in the next transmission to the mobile station, step 54. If the estimate does not exceed $E_s$, then an up power control bit is inserted in the next transmission to the mobile station, step 55. A transmission containing the power control bit is then transmitted to the mobile.

Figure 5:
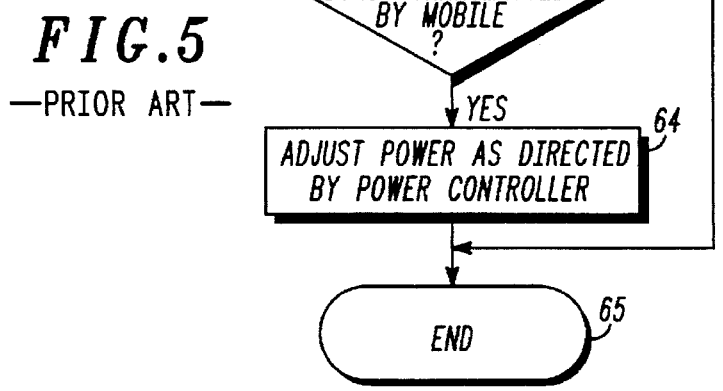
FIG. 5 is a flow chart of a power control process of a prior art mobile station.

In FIG. 5, a flow chart of a power control method, generally designated 60, utilized by a prior art mobile station is illustrated. Method 60 begins at step 61 when a transmission is received by the mobile station. The signal is analyzed to recover the power control bit transmitted by the base station, step 62. The mobile then determines whether the power control bit was transmitted in response to a PCG burst transmitted by the mobile station, decision step 63. As described above, if the mobile station is transmitting at a rate less than full rate, then not all of the PCGs are used. In that case, the power control bit from the base station may be the result of a PCG that was not used by the mobile. If the PCG was not used by the mobile station, then it should not correct its power based on that measurement by the base station. By having knowledge of the transmission delay times, the mobile has a prior knowledge of the PCG with which the power control bit is associated. If the power control bit is in response to a used PCG, then the mobile station adjusts its power as directed, step 64. If the power control bit is not in response to a utilized PCG, then the power control bit is ignored and method 60 ends, step 65.

Referring now to FIG. 6, a matrix, generally designated 68, of power control groups by transmission rate is illustrated. There are two distinctions between the matrix of FIG. 2 and here. The first is that the present invention utilizes every PCG at all of the transmission rates. This is accomplished by the redundant transmission of data. As an example, in the half rate, PCG 1 is transmitted twice, once in 1A and again in 1B. This provides a time diversity which can be utilized by the receiver to increase quality. Due to time diversity the $E_b/N_o$ (Energy per bit/Noise) is improved which results in improved capacity. As illustrated in matrix 68 and represented by the height of the blocks, the transmission of the half rate PCGs is at half the power of the full rate. The result is that there is no change in the amount of overall energy transmitted into the CDMA communication system, but there is an increase in the quality.

Figure 7:
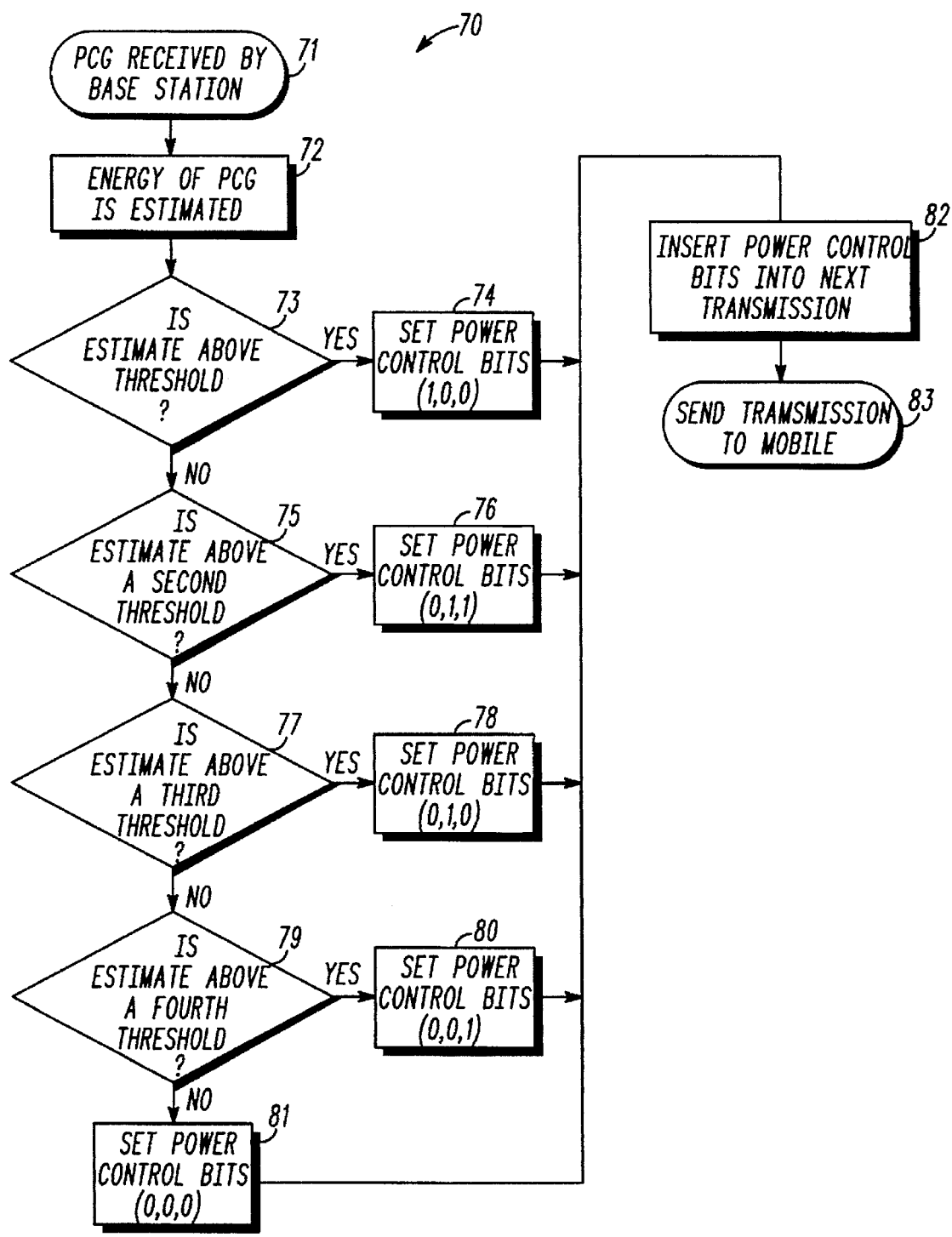
FIG. 7 is a flow chart of a power control process of a base station utilizing the present invention.

In FIG. 7, a flow chart of a method, generally designated 70, of a power control process of a base station utilizing the present invention is illustrated. When a PCG is received by the base station, step 71, the energy is estimated, step 72. The estimate is then compared to a first threshold, decision step 73. This first threshold is the highest threshold and would be the threshold associated with a full rate transmission. If the estimated energy is above the threshold, then the three power control bits are set to a down control (1,0,0), step 74. When this multi-rate power control command is received by a mobile, it will down control it's transmit power regardless of the transmission rate. If the estimate is not above the first threshold, it is compared to a second threshold, decision step 75. This second threshold would be the threshold used for a half rate transmission. If the estimate is above the second threshold, then the multi-rate power control command is set to (0,1,0), step 76. This command would direct half, quarter, and eighth rate transmitters to down control the transmission power and a full rate transmitter to up control its transmission power. Process 70 continues for a third threshold (quarter rate transmission), steps 77 and 78, and a fourth threshold (eighth rate transmission), steps 79 and 80. If none of the thresholds is exceeded, then the multi-rate power control command is set to (0,0,0), step 81. When this command is received by a mobile, it will up control it's transmit power regardless of the transmission rate. This power control command is then inserted into the next transmission to the mobile station, step 82, and transmitted, step 83.

In FIG. 8, a flow chart of a power control method, generally designated 90, of a mobile station utilizing the present invention is illustrated. Method 90 begins with the reception of a signal, step 91. The signal is then processed to recover the power control command, step 92. Method 90 then evaluates the power control command, step 93, to determine the relevant action to be taken at its transmission rate. The mobile then adjusts its power as directed by that power control command, step 94, and the process ends until the next signal is received, step 95.

Figure 9:
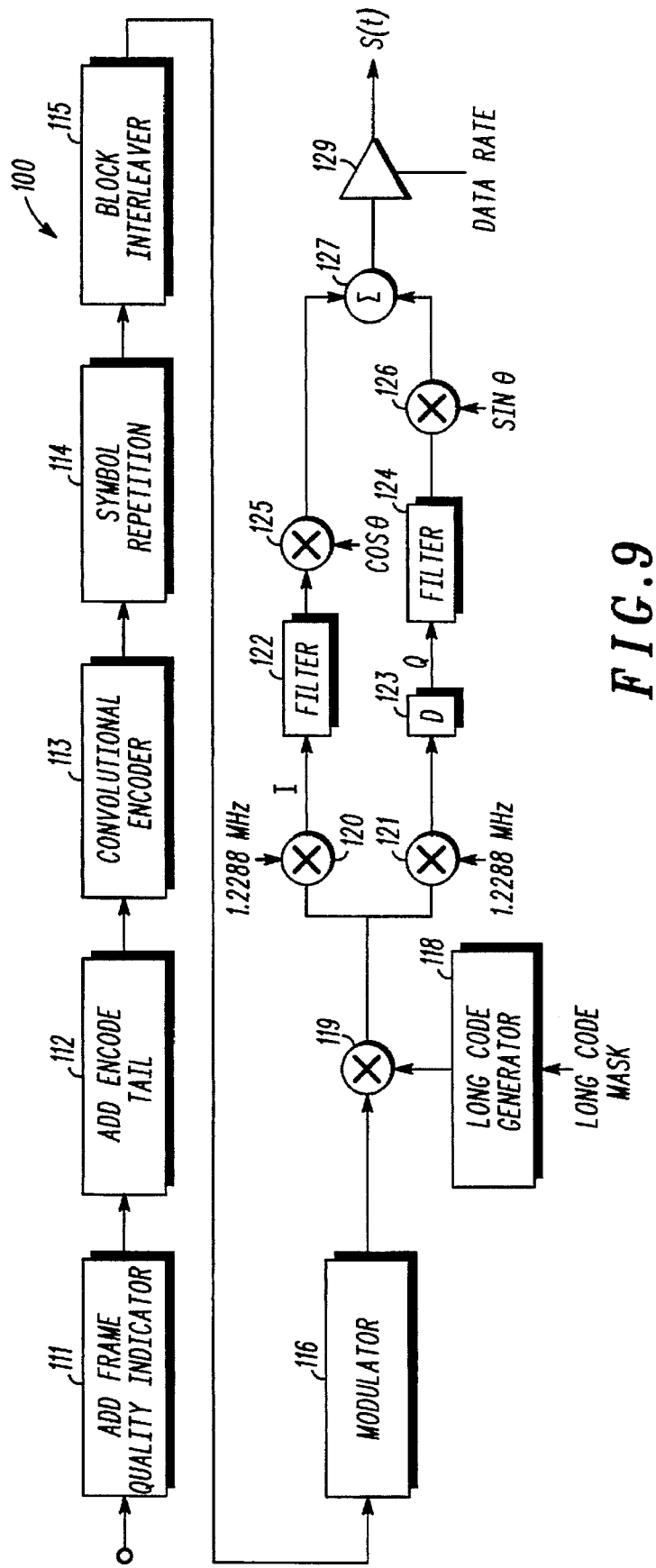
FIG. 9 is a block diagram of a CDMA reverse channel structure designed to utilize the present invention.

This method allows the operator to avoid the problems involved in using the bursted duty cycle by allowing a continuous duty cycle at reduced power. In addition, the repetitive signals afforded by the time diversity of the transmissions provides $E_b/N_o$ resulting in improved capacity. Referring now to FIG. 9, a block diagram of a CDMA reverse channel structure, generally designated 100, is illustrated which utilizes the present invention. As with the prior art, the signal to be transmitted is received at block 111 where a frame quality indicator is added to the signal. Next, tail bits are added in block 112. The signal is convolutionally encoded in block 113; and symbol repetition is performed in block 114. The data is then interleaved (115) and modulated (116).

In the present design, the randomizer is no longer needed since all of the PCGs are used for all of the transmission rates. Therefore, the signal resulting from modulator 116 is input directly to mixer 119 where it is mixed with the long code from long code generator 118.

The signal from mixer 119 is divided into I and Q components; up converted by mixing with a 1.2288 MHz (MegaHertz) signal; and delaying the Q signal in delay 123. The I and Q components are then filtered in filters 122 and 124, respectively; and mixed with the cosine and sine of a signal ø. The two signals are then combined in summer 127.

The signal from summer 127 is then amplified by an adjustable amplifier 129. Amplifier 129 is adjusted based upon the transmission rate. For full rate, the signal will be output at full power. At half rate, the power will be halfpower as represented in the matrix of FIG. 6.

Figure 10:
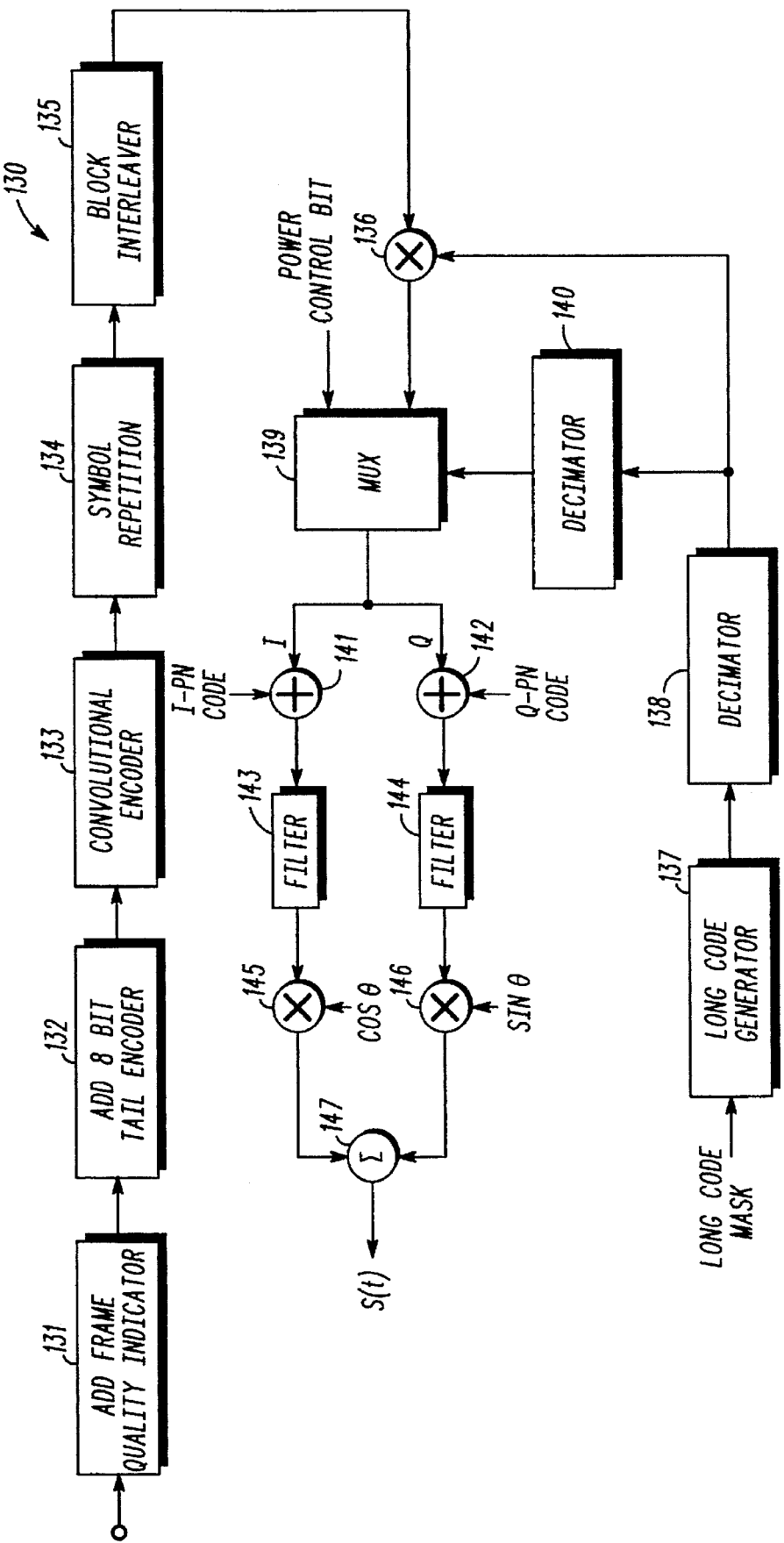
FIG. 10 is a flow chart of an alternative power control process of a mobile station utilizing the present invention.

Referring now to FIG. 10, a block diagram of a CDMA forward channel structure, generally designated 130, is illustrated. As with the channel structure of FIG. 3, the signal to be transmitted is modified by adding a frame quality indicator 131 and a tail encoder 132. The signal is further processed by convolutional encoding, symbol repetition, and block interleaving, blocks 133–135. The output of block interleaver 135 is then mixed with a long code which is generated in long code generator 137 and decimated in decimator 138 to reduce it from 1.2288 Mcps (Megacharacters per second) to 19.2 ksps (kilosymbols per second).

The mixed signal is then input to multiplexer (MUX) 139 where it is multiplexed with the four power control bits. Multiplexer 139 is clocked by the long code which has been further decimated in decimator 140 to 800 Hz. Multiplexer 139 is used to puncture the data stream and insert the four power control bits into the signal to be transmitted. Puncturing the forward link with four bits has an insignificant impact on the downlink quality performance. The current IS-95 downlink uses a rate=½ convolutional code punctured at 800 bps (bits per second). This corresponds to a rate of 0.522. In the present proposal, a rate=½ convolutional code punctured at 2400 bps would result in a rate of 0.570. Alternatively, the rate information could be sent using a control channel, such as the SACCH (Slow Associated Control CHannel). Another way to reduce the impact of the puncture would be to reduce the number of tail bits from eight bits to six bits.

In FIGS. 11 and 12, an alternative embodiment of a communication system utilizing a method of the present invention is illustrated. In FIG. 11, a flow chart of a method, generally designated 150, of a mobile station utilizing the present invention is provided. Method 150 begins its transmission sequence at step 151. A first frame is processed at a first transmission rate for transmission step 152, and stored, step 153 in, for example, a buffer in the mobile station transmit section. A second frame is then processed at a second transmission rate, step 154. An indicator of the second transmission rate is inserted into the first frame, step 155, and the frame is transmitted, step 156. This method of inserting control information is known in the art. It is generally performed by placing the control information in specifically designated positions of a transmission signal (such as a Slow Associated Control CHannel—SACCH); through means of removing some of the data information and substituting the control information (such as a Fast Associated Control CHannel—FACCH); or by means of replacing unused bits (such as puncturing the tail bits as described above). The method then continues, step 157, by inserting indicators of the transmission rate of a subsequent transmission.

In FIG. 12, a flow chart of a method, generally designated 160, of a base station utilizing the present invention is provided. Method 160 begins at step 161 when a signal is received. The first frame is received, step 162, and the second transmission rate is determined, step 163, using the indicator. When the second frame is received, step 164, the power of the second frame is estimated, step 165, and compared to the threshold for the second transmission rate, step 166). A power control command based on the estimated power and transmission rate indicated can then be determined and returned to the mobile on the next base transmission.

Therefore, a method of operation has been provided which permits the use of a continuous signal at any of the transmission rates through use of a plurality of energy thresholds having lower energy levels for lower rate transmissions.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method of controlling power in a CDMA communication system, said method comprising the step of:

processing, at a first transmission rate, a first frame of a continuous signal to be transmitted from a mobile station to a base station;

storing said first frame of said continuous signal in a mobile station;

processing, at a second transmission rate, a second frame of a continuous signal to be transmitted from said mobile station to said base station;

inserting, in said first frame of said continuous signal, an indicator of said second transmission rate of said second frame, to be used to control power in said CDMA communication system; and transmitting said first frame of said continuous signal.

2. The method of claim 1 wherein said first and second transmission rates each comprise one of a full rate, a half rate, a quarter rate, and an eighth rate.

3. The method of claim 1 further comprising the steps of:

receiving said first frame of said continuous signal at a base station;

determining said second transmission rate from said indicator in said first frame;

receiving said second frame of said continuous signal at said base station;

estimating a received power level of said second frame of said continuous signal; and comparing said received power level of said second frame with a threshold power level for said second transmission rate.

4. The method of claim 3 further comprising the steps of transmitting a power control signal from said base station to said mobile station, said power control signal being based upon the comparison of said received power level with said threshold power level.

* * * * *